(12) United States Patent
Lorenzen (10) Patent No.: US 6,176,334 B1
(45) Date of Patent: Jan. 23, 2001

(54) ADJUSTABLE TRACK SUSPENSION

(75) Inventor: Bruce R. Lorenzen, Burlington, WI (US)

(73) Assignee: Case Corporation, Racine, WI (US)

( * ) Notice: Under 35 U.S.C. 154(b), the term of this patent shall be extended for 0 days.

(21) Appl. No.: 09/392,185

(22) Filed: Sep. 9, 1999

(51) Int. Cl.⁷ .................................................. B62D 55/084
(52) U.S. Cl. .......................... 180/9.48; 180/9.45; 180/906
(58) Field of Search ................................. 180/9.48, 9.44, 180/9.45, 906; 280/638, 42

(56) References Cited

U.S. PATENT DOCUMENTS

| | | |
|---|---|---|
| 1,710,116 | 4/1929 | Sembera . |
| 2,535,762 | 12/1950 | Tapp et al. . |
| 2,618,349 | 11/1952 | Ludema . |
| 2,650,104 | 8/1953 | Grace . |
| 2,681,231 | 6/1954 | Kondracki . |
| 2,894,341 | 7/1959 | Amthor et al. . |
| 3,494,439 | 2/1970 | Kline . |
| 3,664,449 * | 5/1972 | Vardell ................................. 180/9.48 |
| 3,674,105 | 7/1972 | Egli . |
| 3,712,398 | 1/1973 | Althaus . |
| 3,749,193 | 7/1973 | Blase et al. . |
| 3,894,598 | 7/1975 | Yeou . |
| 3,998,286 | 12/1976 | Ponikelsky et al. . |
| 4,132,317 | 1/1979 | Arendt et al. . |
| 4,431,074 | 2/1984 | Langerud . |
| 4,448,273 | 5/1984 | Barbieri . |
| 4,457,388 | 7/1984 | Koehler et al. . |
| 5,072,800 * | 12/1991 | Price ..................................... 180/9.48 |
| 5,598,896 | 2/1997 | Haest . |
| 5,607,210 | 3/1997 | Brazier . |
| 5,638,908 | 6/1997 | Masumoto et al. . |
| 5,901,800 * | 5/1999 | Wilson et al. ........................ 180/9.48 |

* cited by examiner

*Primary Examiner*—Kevin Hurley
(74) *Attorney, Agent, or Firm*—Foley & Lardner (57) ABSTRACT

A track suspension is disclosed including a track, a drive wheel engaged with the track, a wheel support, a drive wheel shaft rotationally engaged with the wheel and a drive wheel shaft support. The wheel support is adjustably securable to the drive wheel shaft support in a plurality of laterally disposed positions and the wheel is slidingly positionable with respect to the length of the drive wheel shaft in correspondence with the adjusted position of the wheel support. Also disclosed is a tracked vehicle including a frame, at least one track suspension including a track, a drive wheel engaged with the track, a wheel support, a drive wheel shaft and a drive wheel shaft support. The wheel support is adjustably securable to the drive wheel shaft support in a plurality of laterally disposed positions and the wheel is slidingly positionable with respect to the length of the drive wheel shaft in correspondence with the adjusted position of the wheel support. Also disclosed is a method of adjusting the track width of a tracked vehicle, including the steps of (a) unfixing a wheel support of a track suspension from a drive wheel shaft support, (b) adjusting the lateral location of the track suspension with respect to the drive wheel shaft support, and (c) affixing the wheel support to the drive wheel shaft support.

28 Claims, 7 Drawing Sheets

ADJUSTABLE TRACK SUSPENSION

FIELD OF THE INVENTION

The present invention relates generally to a tracked vehicle. It relates particularly to a tracked work vehicle having a plurality of endless track drives, at least a portion of them both driveable and steerable.

BACKGROUND OF THE INVENTION

It has long been known to provide work vehicles with endless track assemblies, or tracks (sometimes referred to as "crawler treads"), for ground support in order to provide increased traction and support, or flotation, upon moist or loosely packed soils. Due in part to their larger footprints which compact agricultural field soils less than do the tires of wheels of typical agricultural tractors, tracked vehicles have in recent years become increasingly popular in crop farming as well, particularly in connection with larger, heavier and more powerful tractors. Track assemblies, including undercarriage such as idler and bogie wheels, pivot brackets and other supporting structure may be referred to as track suspensions.

Maneuverability of a tractor with a connected implement is of importance, especially at the headlands of a field (i.e., at the ends of crop rows) where a tractor with implement must be turned 180 degrees. Larger wheeled tractors, which are provided with rigid frames having larger turning radii if provided with conventional front wheel steering systems, can require excessive maneuvering and/or width of headland. Their frames are therefore often hinged, or articulated, and they are steered by changing the angle of a front frame with respect to a rear frame, typically by use of a hydraulic cylinder bracketing a pivot joining the front and rear frames. This is an expensive configuration of construction, however, and is generally used only on very large tractors.

Larger tracked tractors utilizing articulated frames are produced in the QUADTRAC™ series of models by Case Corporation, assignee of the present invention. These utilize four endless track assemblies, one each generally located near the front and rear ends of the right and left sides of the tractor. Other tracked tractors generally utilize rigid frames with one endless track on the left side and another on the right side, and are steered by changing speed of either endless track with respect to the other. Such tractors can turn in extremely tight circles, but, in the hands of an inexperienced or inattentive operator, can easily and quickly be inadvertently jackknifed with an implement and damage the implement. Moreover, they provide a harsh ride and generally lack the directional stability desired for ease in making or following long, straight and parallel crop rows.

Because various types of crops often require differing row spacings for efficient utilization of a field, tractors are preferably provided with adjustable track width; i.e., the widths in front and rear elevation views between centerlines of tires or endless track assemblies. While this is relatively easily accomplished with wheeled tractors, it is generally a time-consuming and costly operation with a tracked tractor, requiring significant undercarriage disassembly.

It would be advantageous to provide for a work vehicle, such as an agricultural tractor, to offer the better ride and directional stability of a wheeled tractor while also offering the better traction and lesser soil compaction of a tracked tractor, without incurring the expense of an articulated configuration.

It would also be advantageous to provide for such a work vehicle to include endless track drives which are compact and which are relatively easily repositioned to change vehicle track width.

SUMMARY OF THE PRESENT INVENTION

The present invention relates to a track suspension for a tracked vehicle, the vehicle having a longitudinal axis, the suspension including a track, a rotatable drive wheel engaged with the endless track and configured for driving the endless track, a nonrotatable wheel support configured for supporting the drive wheel in rotation; a rotatable drive wheel shaft having a length, rotationally engaged with the drive wheel, and configured for driving the drive wheel in rotation; and a nonrotatable drive wheel shaft support configured for supporting the drive wheel shaft in rotation and configured to be steerable with respect to the vehicle, wherein the wheel support is adjustably securable to the drive wheel shaft support in a plurality of laterally disposed positions and the drive wheel is slidingly positionable with respect to the length of the drive wheel shaft in correspondence with the adjusted position of the wheel support, the laterally disposed position of the endless track suspension thereby being adjustable with respect to the longitudinal axis.

In accordance with another embodiment, the present invention relates to a dual endless track suspension for a tracked vehicle having a left side and a right side, the suspension including a first endless track suspension extending from the left side, and a second endless track suspension, positioned in spaced-apart and opposing relationship to the first endless track suspension, and extending from the right side, the first and second endless track suspensions each including a track, a rotatable drive wheel engaged with the endless track and configured for driving the endless track assembly, a nonrotatable wheel support configured for supporting the drive wheel in rotation; a rotatable drive wheel shaft having a length, rotationally engaged with the drive wheel, and configured for driving the drive wheel in rotation; a nonrotatable drive wheel shaft support configured for supporting the drive wheel shaft in rotation; at least one endless track support undercarriage coupled to the wheel support; a final drive including a planetary gear set having a sun gear slidingly positionable with respect to the length of the drive wheel shaft while remaining rotationally engaged with the drive wheel shaft, an internal ring gear secured to the drive wheel and positioned coaxial and coplanar with the sun gear, and at least one planet gear positioned intermediate the sun gear and the ring gear, the planet gear rotatably supported by the wheel support; and a flexible coupling for flexibly coupling the drive wheel shaft to a power source, the major axis of the drive wheel shaft and the drive wheel shaft support being adjustably pivotable about a substantially vertical axis for steering the vehicle.

In accordance with another embodiment, the present invention relates to a tracked vehicle including a frame having a longitudinal axis, at least one endless track suspension, the endless track suspension including a track, a rotatable drive wheel engaged with the endless track and configured for driving the endless track assembly, a nonrotatable wheel support configured for supporting the drive wheel; a rotatable drive wheel shaft having a length, rotationally engaged with the drive wheel, and configured for driving the drive wheel in rotation; and a nonrotatable drive wheel shaft support configured for supporting the drive wheel shaft in rotation and steerably coupled to the frame, wherein the wheel support is adjustably securable to the drive wheel shaft support in a plurality of laterally disposed positions and the drive wheel is slidingly positionable with respect to the length of the drive wheel shaft in correspondence with the adjusted position of the wheel support, the laterally disposed position of the endless track suspension with respect to the longitudinal axis being thereby adjustable.

In accordance with another embodiment, the present invention relates to a method of adjusting the track width of a tracked vehicle, the method including the steps of (a) unfixing a wheel support of a track suspension from a drive wheel shaft support of the vehicle, (b) adjusting the lateral location of the endless track suspension from a first position to a second position with respect to the drive wheel shaft support, and (c) affixing the wheel support of the endless track suspension to the drive wheel shaft support.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 1:
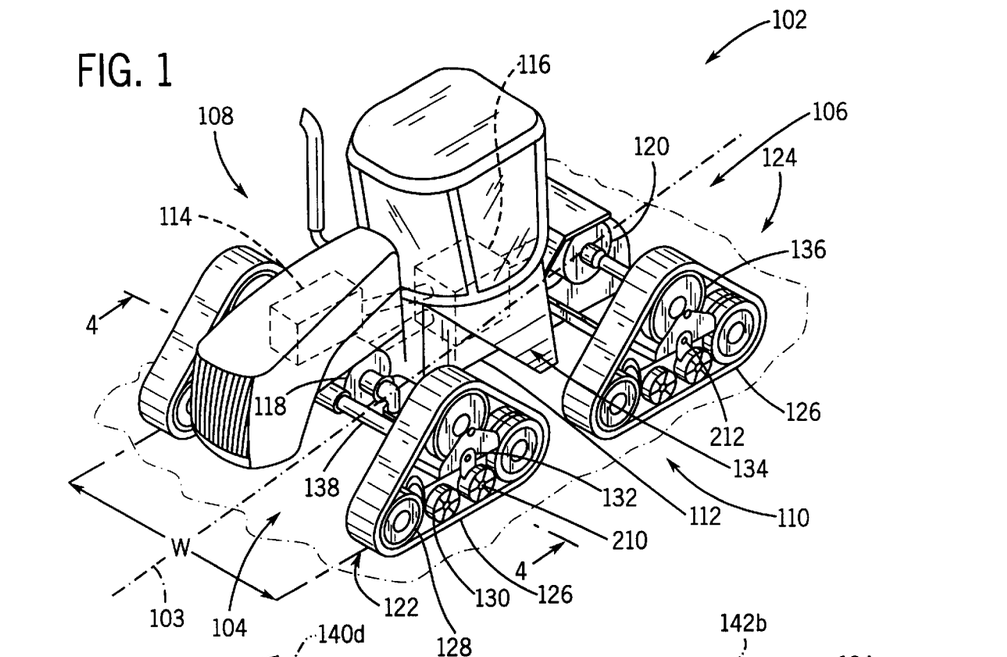
FIG. 1 is a perspective view of an agricultural tractor having an adjustable track width, steerable, front endless track drive.

Referring to FIG. 1 which shows an agricultural tractor 102 provided with track suspensions; i.e., endless track assemblies including tracks 126, wheels (shown as idler wheels 128 and bogie wheels 130), and a pivot frame 132. Tractor 102 includes a front 104 and a rear 106, a left side 110 and a right side 108 and a longitudinal axis 103. Tractor 102 further includes two (one is shown, at rear 106) rigid (i.e., nonsteerable) endless track drives or rigid track drives 124; and two (shown at front 104) steerable, adjustable-track width (indicated by dimension "W") endless track drives or steerable track drives 122. In an alternative embodiment (not shown), a tractor includes steerable, adjustable-track width track drives at both front 104 and rear 106.

It is to be understood that, in the phrase "adjustable track width," the phrase "track width" refers to a width, transverse with respect to axis 103, between centerlines of ground support devices (e.g., wheels, endless track assemblies) in a front or rear elevation view of a vehicle, as indicated by dimension "W" in FIG. 1. In the phrases "track assembly" or "track drive," however, the word "track" refers to an endless track comprising plates, bushings and pins and utilized as a ground support device. The word "endless" refers to the fact that the track, when in use, forms an endless loop and does not mean that loop cannot be disassembled to form one or more individual sections or strips of track. The word "steering" refers to operator-controlled changing of disposition in azimuth of one or more steerable track drives 122 with respect to frame 112 while tractor 102 is under way and for the purpose of guiding tractor 102 in a course or direction of movement selected by the operator.

A typical drive train 134 is also shown, and includes a power source (shown as an engine 114), a transfer unit 116 coupled to engine 114, a front differential unit (shown as a vehicular differential gear unit 118 coupled to transfer unit 116 and to at least one steerable track drive 122, and a rear differential unit 120 coupled to transfer unit 116 and to at least one rigid track drive 124. In alternative embodiments (not shown), other types of drive train (e.g., hydrostatic, electromotive) are provided in place of that shown.

Steerable track drive 122 includes an endless track 126, a drive wheel 136 coupled to endless track 126, idler wheels 128, and one or more bogie wheels 130. Bogie wheels 130 are supported by, and ride upon, a portion of endless track 126 which is contact with a surface upon which tractor 102 is placed. Drive wheel 136 is supported by a wheel support 200 (shown in FIGS. 3 and 4), which is itself supported by a track support undercarriage (shown as a bogie wheel pivot frame 132 in FIGS. 4, 7 and 9) including a pivot 210 having a pivot pin 212. Bogie wheel pivot frame 132 also supports bogie wheels 130 and idler wheels 128. Steerable track drive 122 is movably coupled to frame 112 by a steering actuator 138.

Figure 2:
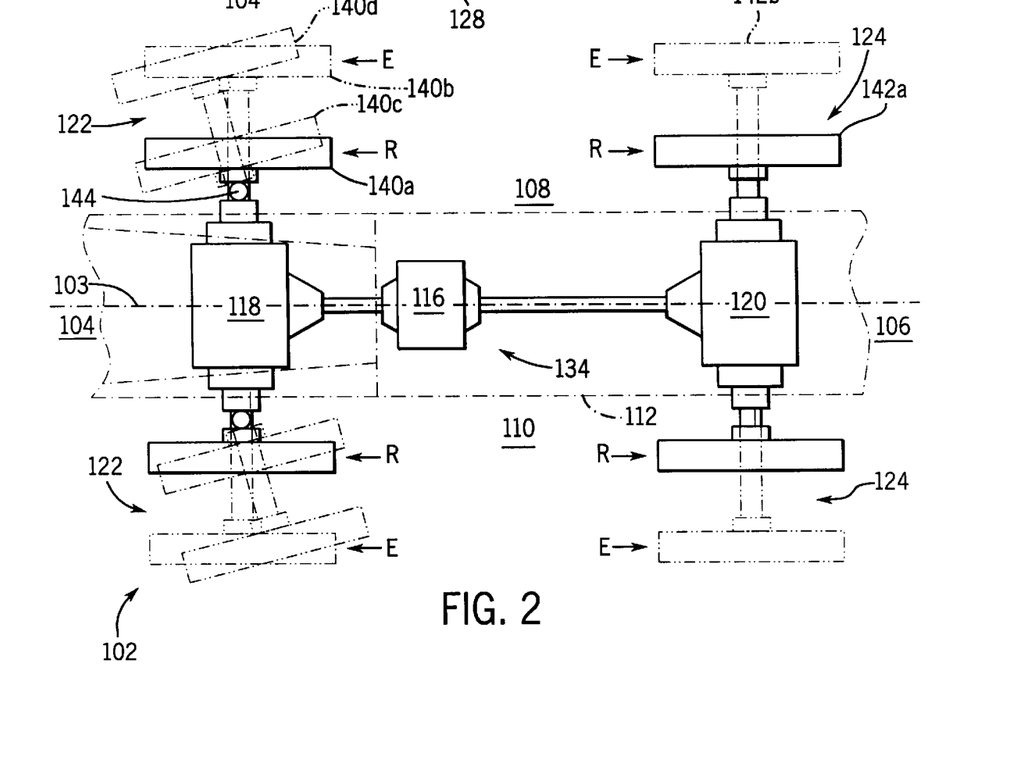
FIG. 2 is a schematic plan view of the tractor, showing track drives in various track width and steering positions.

FIG. 2 is a fragmentary, schematic plan view of tractor 102 showing frame 112, transfer unit 116, front differential unit 118, rear differential unit 120, rigid track drives 124 and steerable track drives 122. Rigid track drives 124 are shown in retracted positions 142a with respect to axis 103, and steerable track drives 122 are shown in retracted positions 140a (both denoted by indicia "R" and solid lines) for a lesser track width "W." Rigid track drives 124 are also shown in extended positions 142b with respect to axis 103, and steerable track drives 122 are also shown in extended positions 140b (both denoted by indicia "E" and double-dashed phantom lines) for a greater track width "W." Steerable track drives 122 are additionally shown in steered, retracted positions 140c (denoted by indicia "R" and single-dash phantom lines) and in steered, extended positions 140d (denoted by indicia "E" and triple-dash phantom lines), wherein they are pivoted with respect to axis 103 about steering axes 144.

Figure 3:
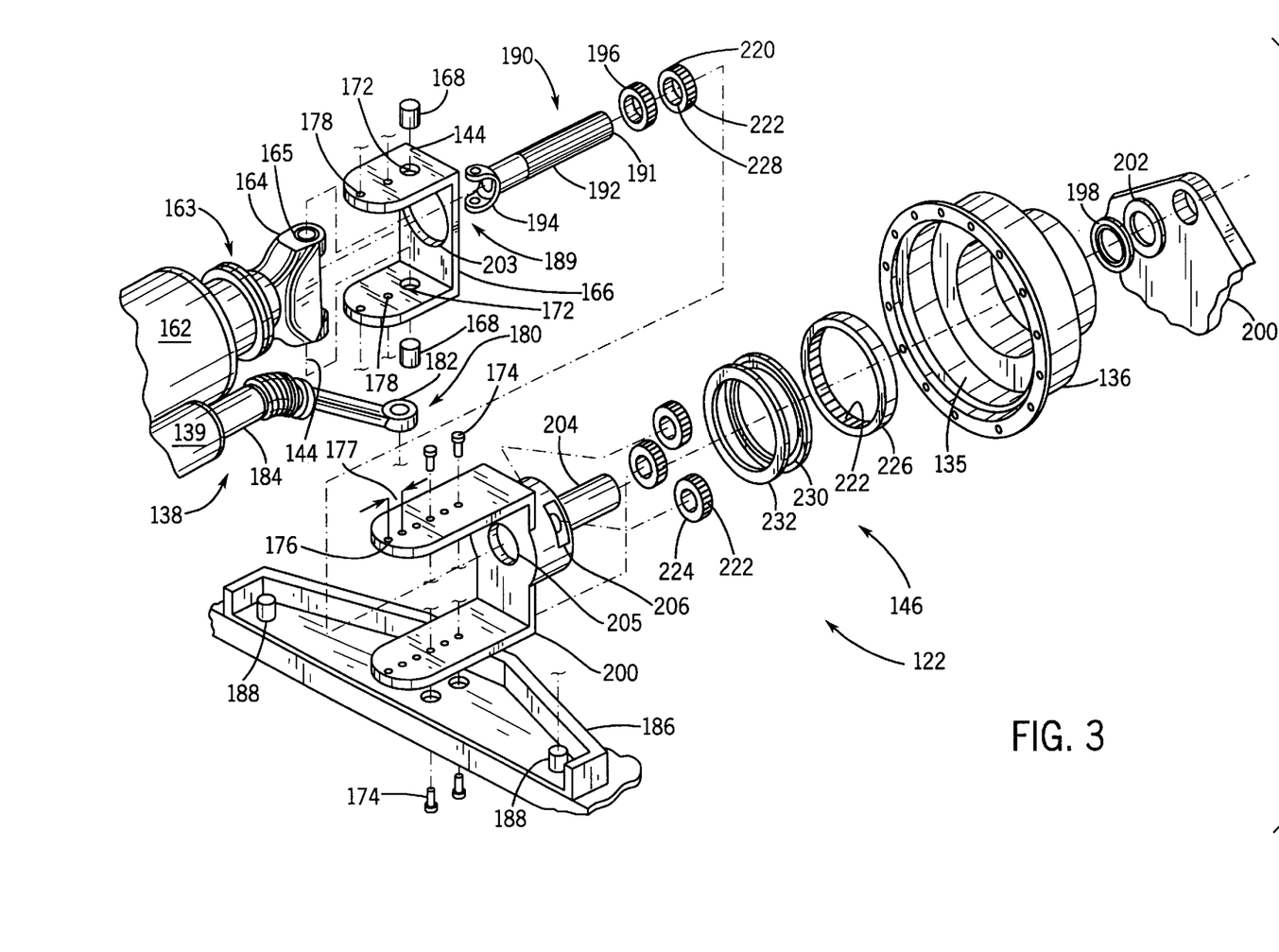
FIG. 3 is an exploded fragmentary view of the adjustable track width, steerable track drive.

FIG. 3 is an exploded, fragmentary, perspective view of tractor 102 showing members of frame 112 and of steerable track drive 122 primarily related to power transmission, steering and track width "W" adjustment of steerable track drive 122. Frame 112 includes a shaft support, shown as a hollow axle shaft housing 162, which houses and supports an axle shaft 160 (shown in FIG. 7) for coupling steerable track drive 122 to front differential unit 118. An axle shaft 160 extends through axle shaft housing 162 from a first end (not shown) at front differential unit 118 to a second end 161 (shown in FIG. 7) in the region of steering axis 144 (described below).

Axle shaft housing 162 has an outer end 163 adjacent steerable track drive 122. A first steering knuckle 164 is affixed to outer end 163. A second steering knuckle 166 is pivotally affixed to first steering knuckle 164 by kingpins 168 engaging apertures 165 in first steering knuckle 164 and apertures 172 in second steering knuckle 166, thereby providing a steering pivot joint and defining steering axis 144. Second steering knuckle 166 is thus pivotally free to be steered with respect to first steering knuckle 164 of frame 112. The angle of steering is controlled by hydraulic power steering actuator 138 having a cylinder portion 139, a rod 184, a first end (not shown) affixed to a stationary member (e.g., axle shaft housing 162 of frame 112) and a second end 180 including a fitting, shown as a tie rod end 182, for pivotal connection to a cylindrical or spherical member shown as a pin 188. Pin 188 is affixed to a bellcrank 186, which is rigidly coupled to second steering knuckle 166. The components of the steering joint are preferably disposed and dimensioned to provide a steering angle about steering axis 144 of at least plus and minus 15 degrees, preferably plus and minus 55 degrees.

Steerable track drive 122 includes a drive wheel support 200 (shown also in FIGS. 4 and 6–10), a drive wheel 136, a drive wheel shaft 190 and a final drive 146. Wheel support 200 is adjustably secured to second steering knuckle 166, and is configured to be slidably movable with respect to second steering knuckle 166 for adjustment of lateral position of steerable track drive 122 with respect to frame 112, and thereby of tractor 102 track width "W." Position of wheel support 200 with respect to second steering knuckle 166 is maintained and secured after adjustment by removably affixing wheel support 200 to second steering knuckle 166; e.g., by threaded fasteners 174 projecting through selected clearance holes, or cylindrical apertures, 176 in wheel support 200 and engaging threaded apertures 178 in second steering knuckle 166. This provides discrete increments of track width "W" adjustment, each increment being equal to a pitch 177 between adjacent apertures 176 in wheel support 200. In an alternative embodiment (not shown), infinitesimal adjustments of track width "W" are provided; for example, by replacing the pitched cylindrical apertures 176 in wheel support 200 by slotted apertures whose slot lengths encompass the range of pitched cylindrical apertures 176 and by using thickened, hardened or otherwise stiffened flat washers under the heads of threaded fasteners 174.

Drive wheel 136 is configured and disposed coaxial with wheel support 200, and is rotatably secured to wheel support 200 by bearings 230 and 198, which are protected by seals 232 and 202 respectively. Drive wheel shaft 190 extends from a first end 189, which is coupled to the second end of axle shaft 160 (e.g., by a flexible coupling, shown as half a constant velocity joint 194) to a second end 191 which is housed within an extension 204 of wheel support 200. In doing so, drive wheel shaft 190 projects through an opening 203 within second steering knuckle 166 and an opening 205 within wheel support 200 to engage a bore 228 of a gear 220, described below. Drive wheel shaft 190 is supported within wheel support 200 by bearing 196. Constant velocity joint 194 is pivotally flexible but laterally stiff; i.e., is provided only an angular degree of freedom.

Final drive 146 is provided to reduce rotational speed of axle shaft 160 and to correspondingly increase torque delivered by axle shaft 160. Final drive 146 is shown as a planetary gearset disposed within drive wheel 136, and within and about extension 204 portion of wheel support 200. Final drive 146 includes a drive or pinion gear, shown as a sun gear 220, three planet gears 224 and an internal ring gear 226. In a preferred embodiment, sun gear 220, planet gears 224 and internal ring gear 226 are coplanar, and include teeth 222 having a conventional spur or helical tooth form. In an alternative embodiment for especially high torque loads, particularly when employing reduction ratios higher than, typically, approximately 10:1, a special tooth form may be necessary to maintain sufficient tooth contact and engagement.

Ring gear 226 is affixed to an interior peripheral surface 135 of drive wheel 136 (e.g., by interference fit, discontinuities such as keys and keyways, threaded fasteners, weld or braze, adhesives, etc.). In an alternative embodiment (not shown), a ring gear may be fabricated integral with drive wheel 136. Planet gears 224 are rotatably secured to wheel support 200 at side openings 206 within extension 204 of wheel support 200, and rotate upon bearings 236 and planet shafts 234 (shown in FIGS. 7 and 9) affixed thereto. Sun gear 220 is slidingly movable along drive wheel shaft 190 but is rotationally engaged with drive wheel shaft 190 (e.g., by a spline 192 shown, keying, polygonal cross section, etc.). Since drive wheel 136 is secured to wheel support 200 and since wheel support 200 is laterally adjustable in position with respect to second steering knuckle 166, and since ring gear 226 is secured to drive wheel 136 and planet gears 224 are secured to wheel support 200, it is necessary for sun gear 220 to be movable upon the length of drive wheel shaft 190 to accommodate a lateral adjustment in position of wheel support 200.

In an alternative embodiment (not shown), sun gear 220 is replaced by gear teeth formed directly on the surface of drive wheel shaft 190 in place of spline 192 shown.

Figures 4, 5:
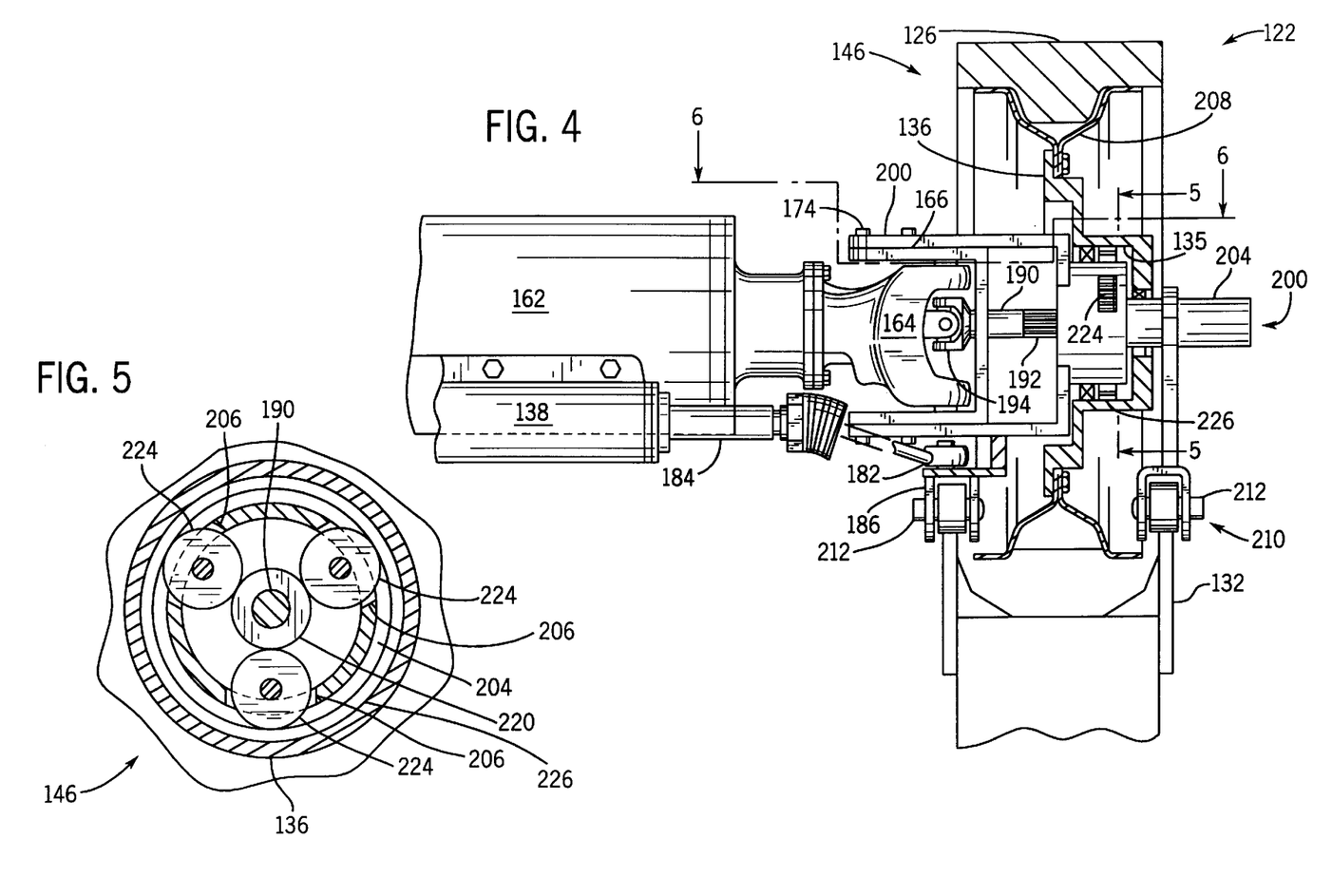
FIG. 4 is a fragmentary front elevation of the track drive taken at line 4—4 of FIG. 1.
FIG. 5 is a fragmentary sectional elevation showing a planetary gear set of the track drive, taken at line 5—5 of FIG. 4.

FIGS. 4 and 5 show more clearly the relationships between sun gear 220, planet gears 224 and ring gear 226. Planet gears 224 are seen to be coplanar with ring gear 226 in FIG. 4, and FIG. 5 shows the meshing relationship of the above gears. While FIGS. 3 and 5 show a quantity of three planet gears 224, more or fewer may be provided depending upon tooth loading and other conventional design parameters well known to those of skill in the art.

FIG. 4 also shows the use of an adapter 208 in adapting and engaging drive wheel 136 to endless track 126, as well as support structure for endless track 126 and including bogie wheel pivot frame 132, pivots 210 and pivot pins 212.

Figure 6:
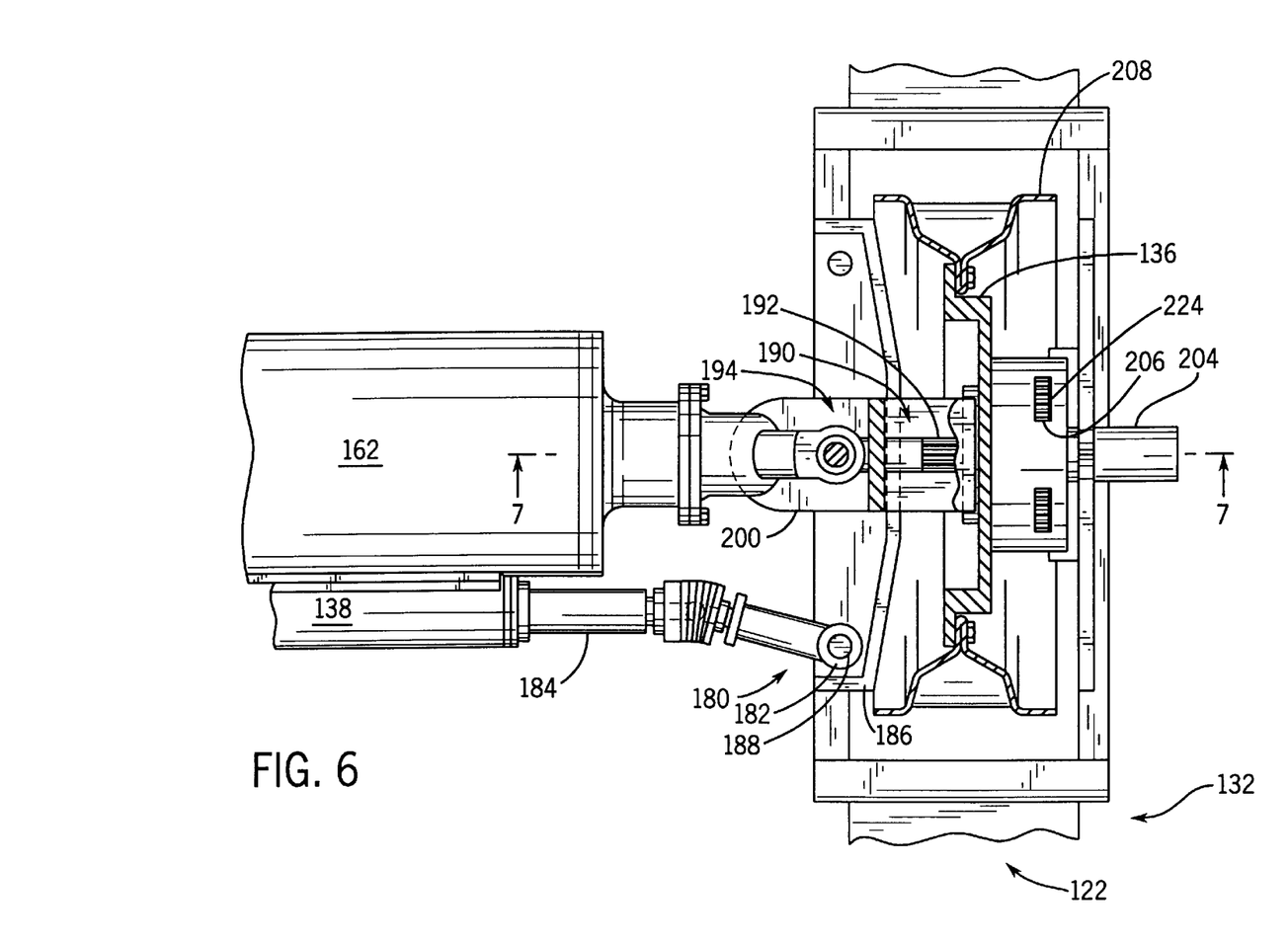
FIG. 6 is a fragmentary, sectional plan view of the track drive in a first position of track width adjustment, taken at line 6—6 of FIG. 4.

FIG. 6 shows an engagement of axle shaft 160 (better seen in FIG. 7) with drive wheel shaft 190 at a flexible coupling 194, located generally within second steering knuckle 166 (better seen in FIGS. 3, 4, 7 and 9) and wheel support 200 in the region of steering axis 144 (shown in FIGS. 2 and 3).

Figure 7:
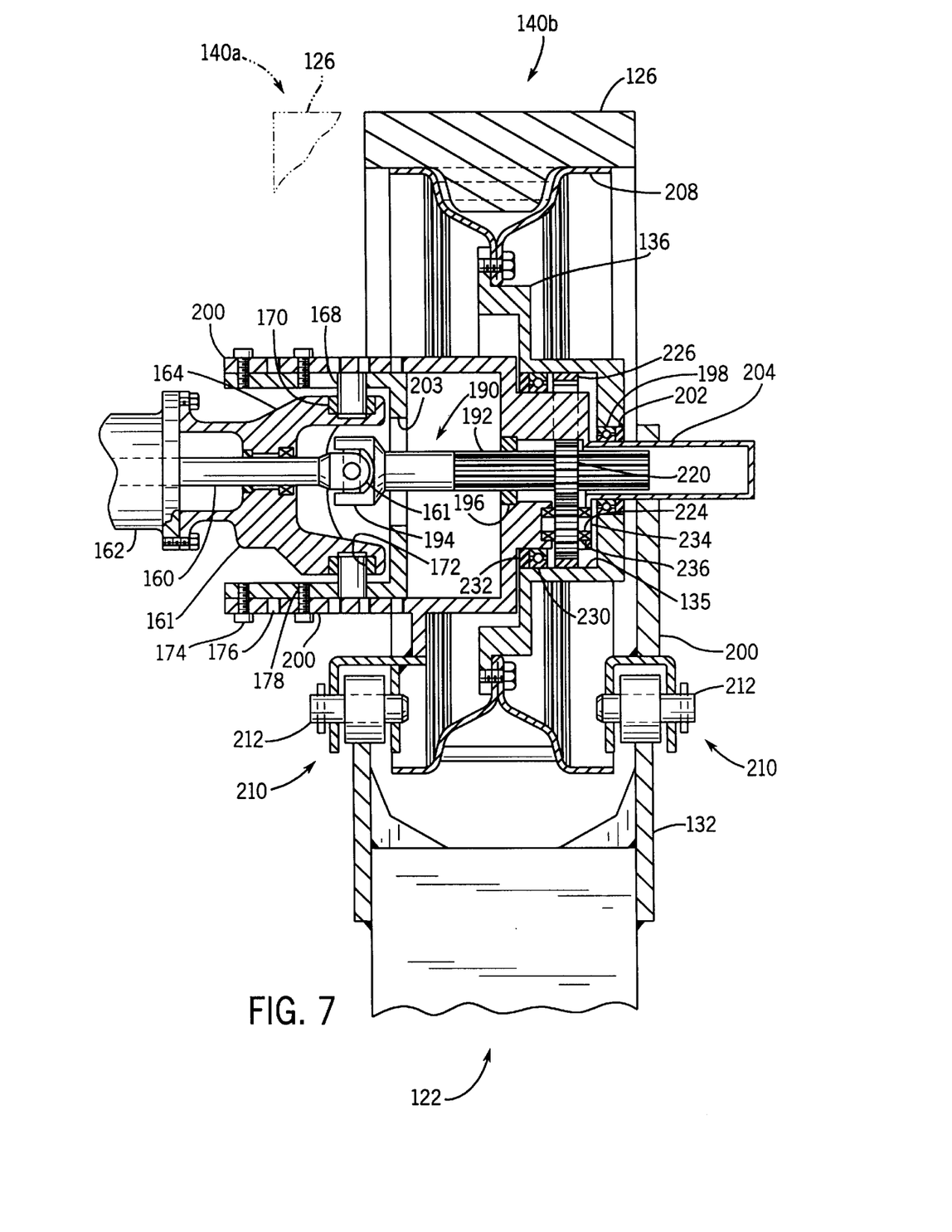
FIG. 7 is a fragmentary, sectional elevation of the track drive in the first position of track width adjustment, taken at line 7—7 of FIG. 6.

FIG. 7 shows steerable, adjustable-track width track drive 122 in extended position 140(b) (shown in solid lines) and in contracted position 140(a) (shown in phantom lines) with respect to frame 112 (shown in FIGS. 1 and 2) and to axle shaft 160, axle shaft housing 162, first steering knuckle 164 and second steering knuckle 166. Track width "W" of tractor 102 is maximized, as threaded fasteners 174 are disposed within the innermost apertures 176 of wheel support 200 with respect to second steering knuckle 166. Sun gear 220, engaged with planet gears 224 supported within wheel support 200 by planet shafts 234 and bearings 236, has slid along drive wheel shaft 190 to accommodate the extended position of the rest of steerable track drive 122. Bearings, shown as bushings 170, facilitate pivotal movement of kingpins 168 coupled between first steering knuckle 164 and second steering knuckle 166.

Figure 8:
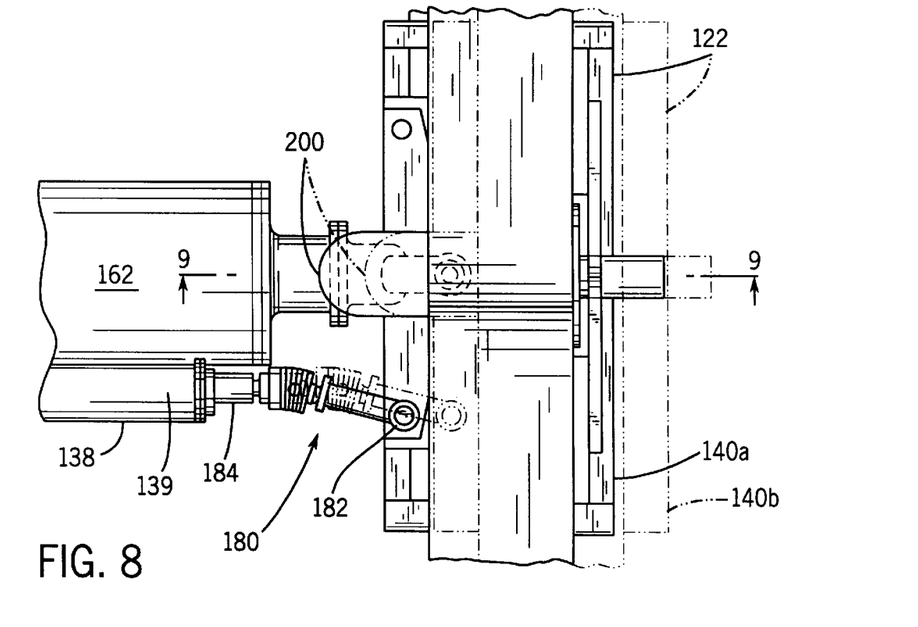
FIG. 8 is a fragmentary plan view of the track drive in a second position of track width adjustment.

FIG. 8 shows steerable, adjustable-track width track drive 122 in retracted position 140a (shown in solid lines) and extended position 140b (shown in phantom lines). Second end 180 of power steering actuator 138 and tie rod end 182 are seen to have been repositioned in cooperation with the repositioning of steerable track drive 122. In the preferred embodiment, this is accomplished by use of a power steering actuator bracket mounting hole pattern (not shown) which includes a quantity and pitch of mounting holes corresponding to those of apertures 176 in wheel support 200 (shown in FIGS. 3 and 7). Cylinder portion 139 of actuator 138 is thereby repositioned in correspondence with steerable track drive 122. In an alternative embodiment, a rod 184 of actuator 138 is adjusted in length; e.g., by use of adapters and adjustable connections. In another alternative embodiment, the position of second end 180 is changed in cooperation with steerable track drive 122 by changing the volume of hydraulic fluid within cylinder 139.

Figure 9:
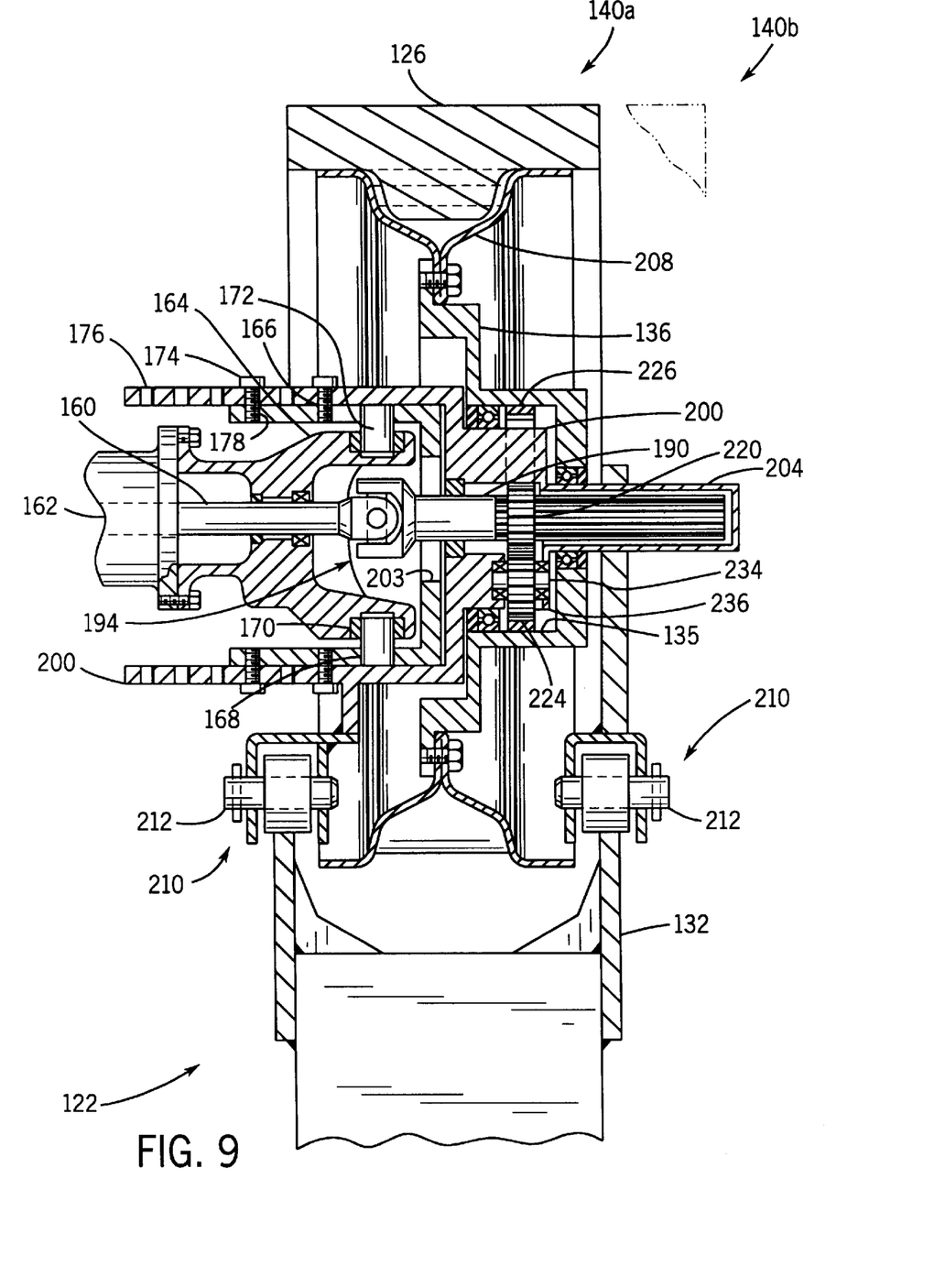
FIG. 9 is a fragmentary front sectional elevation of the track drive in the second position of track width adjustment, taken at line 9—9 of FIG. 8.

FIG. 9 shows steerable, adjustable-track width track drive 122 in a contracted position 140a (shown in solid lines) with respect to frame 112 (shown in FIGS. 1 and 2) and to axle shaft 160, axle shaft housing 162, first steering knuckle 164 and second steering knuckle 166 and fragmentarily in extended position 140b (in phantom lines). Track width "W" of tractor 102 is minimized, as threaded fasteners 174 are disposed within the outermost apertures 176 of wheel support 200 with respect to second steering knuckle 166. Sun gear 220, engaged with planet gears 224 supported within wheel support 200 by planet shafts 234 and bearings 236, has slid along drive wheel shaft 190 to accommodate the contracted position of the rest of steerable track drive 122. Compare FIG. 9 with FIG. 7.

Figure 10:
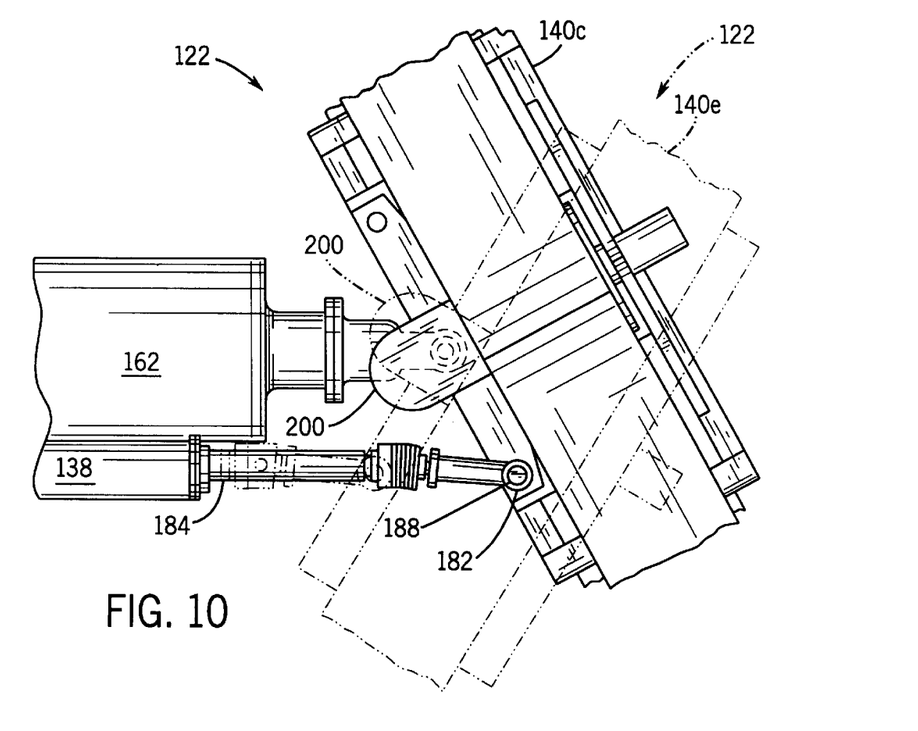
FIG. 10 is a fragmentary plan view of the track drive steered in a first position in solid lines and in a second position in phantom lines.

FIG. 10 shows steerable, adjustable-track width track drive 122 steered by actuator 138 in position 140c (shown in solid lines) corresponding to a turn of tractor 102 toward left side 110, and in position 140e (shown in phantom lines) corresponding to a turn of tractor 102 toward right side 108. Steerable track drive 122 is depicted in an extended position 140b of track width "W" adjustment (shown in FIGS. 2 and 8); comparison with FIG. 8 reveals that a depiction in contracted position 140a (shown in FIGS. 2 and 8) would be similar in appearance.

Thus, it should be apparent that there has been provided in accordance with the present invention an adjustable track suspension that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A track suspension for a tracked vehicle, the vehicle having a longitudinal axis, the suspension comprising:
    an endless track;
    a rotatable drive wheel engaged with the endless track and configured for driving the endless track;
    a nonrotatable wheel support configured for supporting the drive wheel in rotation;
    a rotatable drive wheel shaft having a length, rotationally engaged with the drive wheel and configured for driving the drive wheel in rotation; and
    a nonrotatable drive wheel shaft support configured for supporting the drive wheel shaft in rotation and configured to be steerable with respect to the vehicle;
    wherein the wheel support is adjustably securable to the drive wheel shaft support in a plurality of laterally disposed positions and the drive wheel is slidingly positionable with respect to the length of the drive wheel shaft in correspondence with the adjusted position of the wheel support, the laterally disposed position of the track suspension thereby being adjustable with respect to the longitudinal axis.

2. The track suspension of claim 1, further comprising at least one track support undercarriage, the track support undercarriage coupled to the wheel support.

3. The track suspension of claim 2, further comprising a final drive for rotationally coupling the drive wheel shaft to the drive wheel.

4. The track suspension of claim 3, further comprising a pinion gear associated with the drive wheel shaft.

5. The track suspension of claim 4, wherein the pinion gear includes gear teeth formed within the peripheral surface of the drive wheel shaft and the pinion gear is thereby integral with the drive wheel shaft.

6. The track suspension of claim 4, wherein the pinion gear is configured to be slidingly positionable along the length of the drive wheel shaft while remaining rotationally engaged with the drive wheel shaft.

7. The track suspension of claim 4, wherein the final drive includes a planetary gear set and the pinion gear is the sun gear of the planetary gear set.

8. The track suspension of claim 7, wherein the planetary gear set includes an internal ring gear secured to the wheel, the ring gear positioned coaxial with the sun gear, and further includes at least one planet gear positioned intermediate the sun gear and the ring gear and configured to rotationally engage the ring gear with the sun gear and thereby the drive wheel with the drive wheel shaft.

9. The track suspension of claim 8, wherein the planet gear is rotatably supported by the wheel support.

10. The track suspension of claim 9, wherein the major axis of the drive wheel shaft and of the drive wheel shaft support is adjustably pivotally positionable about a substantially vertical axis for steering the vehicle.

11. The track suspension of claim 10, wherein the vehicle further includes a power source, the track suspension further comprising a flexible coupling for coupling the drive wheel shaft to the power source in a plurality of steering positions.

12. A dual track suspension for a tracked vehicle having a left side and a right side, the suspension comprising:
    a first track suspension as described in claim 9 and extending from the left side; and
    a second track suspension as described in claim 9, positioned in spaced-apart and opposing relationship to the first track suspension, and extending from the right side.

13. The dual track suspension of claim 12, further comprising a differential unit having a first output shaft associated with the left side and coupled to the flexible coupling of the first track suspension and a second output shaft associated with the right side and coupled to the flexible coupling of the second track suspension.

14. A tracked vehicle comprising:

a frame having a longitudinal axis;

at least one track suspension, the track suspension including:

an endless track;

a rotatable drive wheel engaged with the endless track and configured for driving the endless track;

a nonrotatable wheel support configured for supporting the drive wheel;

a rotatable drive wheel shaft having a length, rotationally engaged with the drive wheel, and configured for driving the drive wheel in rotation; and a nonrotatable drive wheel shaft support configured for supporting the drive wheel shaft in rotation and steerably coupled to the frame;

wherein the wheel support is adjustably securable to the drive wheel shaft support in a plurality of laterally disposed positions and the drive wheel is slidingly positionable with respect to the length of the drive wheel shaft in correspondence with the adjusted position of the wheel support, the laterally disposed position of the track suspension with respect to the longitudinal axis being thereby adjustable.

15. The tracked vehicle of claim 14, wherein the track suspension further includes at least one track support undercarriage, the track support undercarriage coupled to the wheel support.

16. The tracked vehicle of claim 15, wherein the track suspension further includes a final drive for coupling the drive wheel shaft to the drive wheel.

17. The tracked vehicle of claim 16, further comprising a pinion gear associated with the drive wheel shaft.

18. The tracked vehicle of claim 17, wherein the pinion gear includes gear teeth formed within the peripheral surface of the drive wheel shaft and the pinion gear is thereby integral with the drive wheel shaft.

19. The tracked vehicle of claim 17, wherein the pinion gear is configured to be slidingly positionable along the length of the drive wheel shaft while remaining rotationally engaged with the drive wheel shaft.

20. The tracked vehicle of claim 17, wherein the final drive includes a planetary gear set and the pinion gear is the sun gear of the planetary gear set.

21. The tracked vehicle of claim 20, wherein the planetary gear set includes an internal ring gear secured to the drive wheel, the ring gear positioned coaxial with the sun gear, and further includes at least one planet gear positioned intermediate the sun gear and the ring gear and configured to rotationally engage the ring gear with the sun gear and thereby the drive wheel with the drive wheel shaft.

22. The tracked vehicle of claim 21, wherein the planet gear is rotatably supported by the wheel support.

23. The tracked vehicle of claim 22, wherein the major axis of the drive wheel shaft and of the drive wheel shaft support is adjustably pivotally positionable about a substantially vertical axis for steering the vehicle.

24. The tracked vehicle of claim 23, further comprising a power source and a flexible coupling, and wherein the drive wheel shaft is flexibly coupled to the power source by the flexible coupling.

25. The tracked vehicle of claim 24, further comprising a left side, a right side and a second track suspension associated with the right side, and wherein the track suspension is a first track suspension extending from the left side and the second track suspension extends from the right side and is thereby positioned in spaced-apart and opposing relationship to the first track suspension.

26. The tracked vehicle of claim 25, further comprising a differential unit having a first output shaft associated with the left side and coupled to the flexible coupling of the first track suspension and a second output shaft associated with the right side and coupled to the flexible coupling of the second track suspension.

27. A method of adjusting the track width of a tracked vehicle, the method including the steps of:

unfixing a wheel support of a track suspension from a drive wheel shaft support of the vehicle;

adjusting the lateral location of the wheel support, and thereby of the track suspension, from a first position to a second position with respect to the drive wheel shaft support; and affixing the wheel support of the track suspension to the drive wheel shaft support.

28. The method of claim 27, further including the steps of:

unfixing a wheel support of a second track suspension from a second drive wheel shaft support;

adjusting the lateral location of the wheel support of the second track suspension, and thereby the second track suspension, from a first position to a second position with respect to the second drive wheel shaft support and to the track suspension; and affixing the wheel support of the second track suspension to the second drive wheel shaft support.

* * * * *